United States Patent [19]
Boudot et al.

[11] Patent Number: 5,117,086
[45] Date of Patent: May 26, 1992

[54] PROCESS AND HEAD FOR LASER WORKING IN A TUBE

[75] Inventors: Cécipe Boudot; Jacques Griffaton, both of Chalon S/Saone, France

[73] Assignee: Framatome, Courbevoie, France

[21] Appl. No.: 634,607

[22] Filed: Dec. 27, 1990

[30] Foreign Application Priority Data

Dec. 28, 1989 [FR] France ................. 89 17378

[51] Int. Cl.$^5$ ............................................. B23K 26/00
[52] U.S. Cl. ....................... 219/121.64; 219/121.63; 219/121.84; 376/260
[58] Field of Search ................... 219/121.64, 121.84, 219/121.63, 121.85; 376/260

[56] References Cited

U.S. PATENT DOCUMENTS 4,978,834 12/1990 Griffaton .................. 219/121.63
4,983,796 1/1991 Griffaton .................. 219/121.63

FOREIGN PATENT DOCUMENTS 0300458 1/1989 European Pat. Off. .

Primary Examiner—C. L. Albritton
Attorney, Agent, or Firm—Pollock, Vande Sande & Priddy

[57] ABSTRACT

The head (1) for laser working in centered in the tube (2) by two open circular brushes. The laser working is performed under the protection of a primary gas emerging through the window (5) for passage of the laser beam and of a secondary gas circulating axially between the head and the tube (2). The invention is used in the socket fitting of the tubes of the steam generators of pressurized-water nuclear reactors.

7 Claims, 1 Drawing Sheet

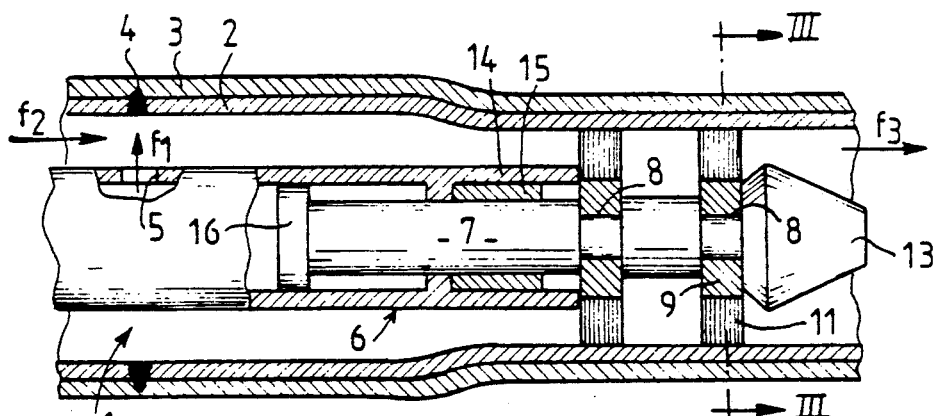
FIG.1
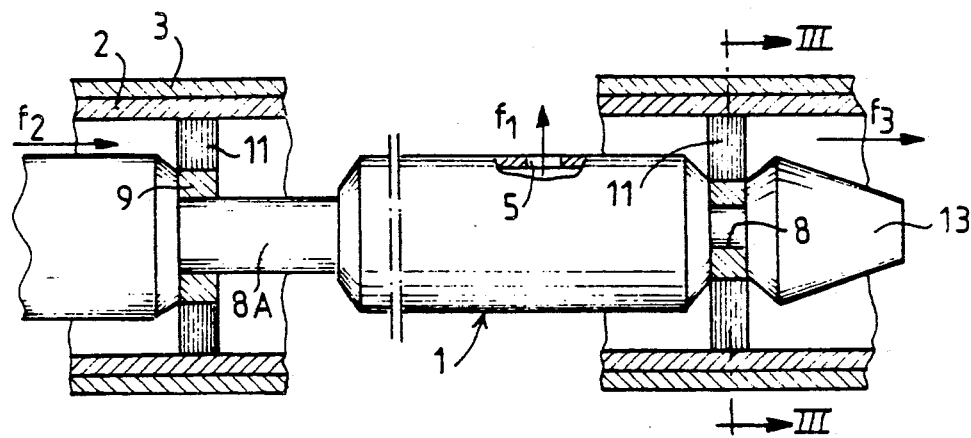
FIG.2
FIG.3
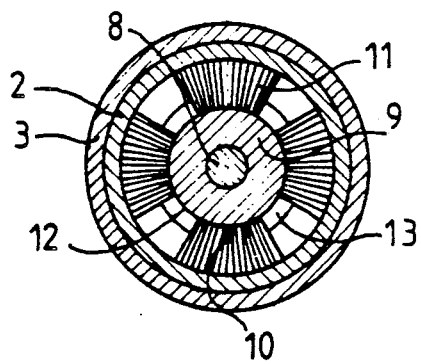

5,117,086

PROCESS AND HEAD FOR LASER WORKING IN A TUBE

FIELD OF THE INVENTION

The present invention relates to laser working in tubes of small diameter, such as the primary-water tubes of the steam generators of pressurized-water nuclear reactors.

BACKGROUND OF THE INVENTION

It is conventional to pass a primary gas into the working zone, through the working head, in order, in particular, to protect the oxidation fusion bath.

SUMMARY OF THE INVENTION

The object of the invention is to permit an increase in the quality, reliability and reproducibility of the welds.

To this end, the subject of the invention is a process for laser working in a tube, of the type in which a primary protective gas is passed into the working zone, through the working head. According to the invention secondary gas is also passed between the periphery of the head and the tube, to reach into the working zone.

Another object of the invention is a head for laser working in a tube, which head is particularly adapted for the implementation of this process, in that the working head comprises two centering components spaced axially from one another, at least one of these centering components being constituted by an open circular brush.

BRIEF DESCRIPTION OF THE DRAWINGS

Examples of implementation of the invention will now be described with reference to the accompanying drawing, in which:

FIG. 1 is a longitudinal view partly in section of a head for laser working according to the invention;

FIG. 2 is a similar view of a variant; and

FIG. 3 is section view along on the line III—III of FIG. 1 or of FIG. 2.

DETAILED DESCRIPTION

FIG. 1 shows a head 1 for schematically laser welding, which head is intended to weld repair sleeve 2 in a primary-water tube 3 of the steam generator of a pressurized-water nuclear reactor. As is conventional in the art (see, for example, the Patent Application FR 89/08,634 in the name of the Applicant), the weld is executed along a plurality of very close circular bands such as the band 4 which is shown, after prefixing of the sleeve in the tube by mechanical expansion.

The general structure of the head 1 is conventional and may, for example, be that described in the aforementioned patent application. FIG. 1 shows only the front (or downstream) end of this head, and more particularly exit window 6 of the focused laser beam and the end ogive 6, which is equipped with its centering means.

The ogive 6 comprises a shaft 7 which exhibits two bearing surfaces 8 of reduced diameter. On each bearing surface there is mounted, to be free in terms of rotation but immovable in terms of translation, a hub 9, the external surface of which is divided into an even number of sectors (FIG. 3): sectors 10, numbering four in this example, on which there project a large number of brush bristles 11, and, between the sectors 10, an identical number of sectors 12 without any bristles. Thus, in end-on view (FIG. 3), each set 9 to 12 forms a circular brush interrupted by the four sectors 12.

The front end of the shaft 7 carries a convergent nose 13, and its upstream part is mounted to slide in a downstream end tube 14 of the head 1, in which tube a guide ring 15 is provided. The upstream end of the shaft 7 carries a broadening 16 which cooperates with a radical abutment 17 provided in the tube 14 to limit the extension of the shaft 7 outside the tube 14.

In order to execute the weld, the head 1 is driven into the sleeve 2 from the water reservoir (not shown) of the steam generator. During this movement, the bristles 11 rub on the internal wall of the sleeve, so that the shaft 7 is retracted into the tube 14 as far as its rear abutment position shown, in which the upstream hub 9 abuts against the downstream end of the tube 14. The window 5 is thus brought to the desired location.

In order to execute the weld, two currents of gas are passed into the working zone:

(a) A current of primary gas conducted through the interior of the torch and emerging through the window 5 along the arrow f1. This primary gas, which may be a neutral gas such as argon, helium or nitrogen possibly containing a small proportion, for example of the order of 1%, of an active gas such as oxygen or hydrogen, has essentially the purpose of protecting the oxidation fusion bath.

(b) A current of secondary gas flowing axially, from a point situated upstream of the working zone, in the annular interval existing between the head 1 and the sleeve 2, as indicated by the arrow f2. This secondary gas may likewise be a neutral gas containing a small proportion, for example a few %, of an active gas, and has essentially the purpose of deactivating the metal particles vaporized at the surface of the fusion bath. This permits, in particular, the protection of the head 1 from the splashes originating from the fusion bath.

By virtue of the constitution of the centering device formed by the two open brushes, the two gas currents can circulate easily and, in particular, can be evacuated freely in a downstream direction, along the arrow f3. The effectiveness of the gases is thus increased, as are consequently the quality and the reproducibility of the welds.

When a weld band has been completely executed by rotation of the head 1, the latter is retracted through a small distance, the brushes remaining fixed, and the following band is executed in the same manner.

In the variant represented in FIG. 2, the shaft 7 carries only one open brush, and the head 1 comprises, upstream of the window 5 and possibly at a relatively large distance from the latter, a cylindrical bearing surface 8A delimited by two radial shoulders and on which a second open brush of the same constitution as the first is mounted for free rotation and sliding. An effective centering of the head 1 is thus obtained, as previously, permitting the latter to move freely in terms of rotation and in terms of translation in the working zone, as well as a free circulation of the primary and secondary gases.

In a variant, it is understood that, in each case, the secondary gas would be able to circulate between the head 1 and the sleeve 2 in the inverse direction of the arrow f2.

The invention is applied to other types of laser operations, for example to the welded connection of two tubes, which are disposed end to end or fitted one into the other.

We claim:

1. Process for laser working in a tube, of the type in which a primary protective gas is passed into the working zone through the working head (1), characterized in that a secondary gas is also passed between the periphery of the head and the tube (2), to reach into the working zone.

2. Process according to claim 1, characterized in that the secondary gas is a neutral gas containing a small proportion of an active gas.

3. Head for laser working in a tube, of the type comprising two centering components spaced axially from one another, characterized in that at least one of the centering components (9 to 12) in constituted by an open circular brush.

4. Head for laser working according to claim 3, characterized in that the brush comprises a hub (9) which exhibits angular sectors (10) from which bristles (11) proceed radially and, between these sectors, other angular sectors (12) without any bristles.

5. Head for laser working according to claim 3, characterized in that it comprises two open brushes (9 to 12) spaced axially from one another.

6. Head for laser working according to claim 5, characterized in that the two open brushes are disposed at the end of the head (1), beyond an exit window (5) of the laser beam.

7. Head for laser working according to claim 5, characterized in that the two open brushes are disposed on either side of a laser beam exit window (5) of the head.

* * * * *

UNITED STATES PATENT AND TRADEMARK OFFICE
CERTIFICATE OF CORRECTION

PATENT NO. : 5,117,086
DATED : May 26, 1992
INVENTOR(S) : Cecile Boudot and Jacques Griffaton It is certified that error appears in the above-indentified patent and that said Letters Patent is hereby corrected as shown below:

On the title page, Item [75] Inventors: should read as --Cecile--

Column 4, claim 3, line 4, change "in" to --being--

Signed and Sealed this

Twenty-ninth Day of March, 1994

Attest:

BRUCE LEHMAN

*Attesting Officer*  *Commissioner of Patents and Trademarks*